United States Patent
Chen et al.

(10) Patent No.: US 8,978,546 B2
(45) Date of Patent: Mar. 17, 2015

(54) DEVICE FOR PRESERVING AND DISPENSING WINE

(71) Applicants: Andrew Yuen Chin Chen, Hong Kong (CN); Amy Decem Cheng, Hong Kong (CN); Dick Tak Fung Leung, Hong Kong (CN); Paul Cheuk Wai Lai, Hong Kong (CN); Raymond Wai Ming Wong, Hong Kong (CN)

(72) Inventors: Andrew Yuen Chin Chen, Hong Kong (CN); Amy Decem Cheng, Hong Kong (CN); Dick Tak Fung Leung, Hong Kong (CN); Paul Cheuk Wai Lai, Hong Kong (CN); Raymond Wai Ming Wong, Hong Kong (CN)

(73) Assignee: Electrical & Electronics Ltd, Hong Kong (CN)

( * ) Notice: Subject to any disclaimer, the term of this patent is extended or adjusted under 35 U.S.C. 154(b) by 0 days.

(21) Appl. No.: 14/346,739

(22) PCT Filed: Sep. 24, 2012

(86) PCT No.: PCT/IB2012/055084
§ 371 (c)(1),
(2) Date: Mar. 23, 2014

(87) PCT Pub. No.: WO2013/042101
PCT Pub. Date: Mar. 28, 2013

(65) Prior Publication Data
US 2014/0242241 A1     Aug. 28, 2014

Related U.S. Application Data

(60) Provisional application No. 61/538,808, filed on Sep. 24, 2011.

(51) Int. Cl.
*C12G 1/00*     (2006.01)
*B67D 1/00*     (2006.01)
(Continued)

(52) U.S. Cl.
CPC .......... *B67D 1/0043* (2013.01); *B67D 1/0085* (2013.01); *B01F 3/04503* (2013.01); *C12G 1/00* (2013.01); *B67D 2001/0812* (2013.01); *B01F 2215/0072* (2013.01)
USPC ............. 99/323.1; 99/277; 99/277.2; 261/28; 261/109; 426/15; 426/474; 426/477

(58) Field of Classification Search
CPC .............. B01F 2215/0072; B01F 2003/04865; B01F 2003/04872; B01F 2003/04879; B01F 3/04794; B01F 3/04808; C12G 2200/21; C12G 2200/25
USPC ........................................... 426/15, 474, 477
See application file for complete search history.

(56) References Cited

U.S. PATENT DOCUMENTS 4,494,452 A * 1/1985 Barzso ................... 99/323.1
4,595,121 A * 6/1986 Schultz .................... 222/1
(Continued)

FOREIGN PATENT DOCUMENTS

CN      1167472 A    12/1997
CN      1282708 A     2/2001
(Continued)

OTHER PUBLICATIONS

Feb. 7, 2013 International Search Report for PCT/IB2012/055084.
(Continued)

*Primary Examiner* — Anthony Weier
(74) *Attorney, Agent, or Firm* — Law Offices of Albert Wai-Kit Chan, PLLC (57) ABSTRACT

This invention provides a device for preserving and dispensing a beverage, having: (a) a housing including one or more compartments, each compartment for storing a beverage container; and (b) one or more dispensing head removably connected to a cartridge, wherein said dispensing head having an aerator for aerating said beverage, wherein said cartridge removably and securely holds a beverage container, wherein said beverage flows from said container to said dispensing head by the force of a pump connected to said cartridge. In one embodiment, the beverage is wine.

8 Claims, 7 Drawing Sheets

(51) Int. Cl.
*B01F 3/04* (2006.01)
*B67D 1/08* (2006.01)

(56) References Cited

U.S. PATENT DOCUMENTS

| | | | | |
|---|---|---|---|---|
| 4,785,724 | A * | 11/1988 | Vassallo | 99/323.1 |
| 5,154,112 | A * | 10/1992 | Wettern | 99/323.1 |
| 5,458,165 | A * | 10/1995 | Liebmann, Jr. | 141/64 |
| 5,499,758 | A | 3/1996 | McCann et al. | |
| 5,566,730 | A * | 10/1996 | Liebmann, Jr. | 141/64 |
| 5,595,104 | A * | 1/1997 | Delaplaine | 99/323.1 |
| 5,633,232 | A * | 5/1997 | Matsuo et al. | 514/1.7 |
| 6,508,163 | B1 * | 1/2003 | Weatherill | 99/323.1 |
| 6,557,369 | B1 * | 5/2003 | Phelps et al. | 62/457.5 |
| 6,557,459 | B1 * | 5/2003 | Phelps et al. | 99/323.1 |
| 6,607,100 | B2 * | 8/2003 | Phelps et al. | 222/152 |
| 6,607,105 | B2 * | 8/2003 | Phelps et al. | 222/400.8 |
| 6,658,859 | B2 * | 12/2003 | Phelps et al. | 62/3.6 |
| 6,886,605 | B2 * | 5/2005 | Luis | 141/8 |
| 6,913,167 | B2 * | 7/2005 | Phelps et al. | 222/152 |
| 7,032,364 | B2 * | 4/2006 | Yoshida et al. | 53/432 |
| 7,108,023 | B2 * | 9/2006 | Luis | 141/65 |
| 7,162,851 | B2 * | 1/2007 | Yoshida et al. | 53/432 |
| 7,299,601 | B2 * | 11/2007 | Yoshida et al. | 53/264 |
| 7,708,241 | B2 * | 5/2010 | Wiemholt | 248/138 |
| 7,743,796 | B1 * | 6/2010 | Schooley | 141/65 |
| 8,272,538 | B2 * | 9/2012 | Weinberg et al. | 222/152 |
| 8,701,910 | B1 * | 4/2014 | Michalopoulos | 215/311 |
| 2003/0232115 | A1 | 12/2003 | Eckenhausen et al. | |
| 2006/0070971 | A1 * | 4/2006 | Michalopoulos | 215/228 |
| 2007/0199612 | A1 * | 8/2007 | Larimer et al. | 141/65 |
| 2008/0035598 | A1 * | 2/2008 | Simons | 215/228 |
| 2010/0058933 | A1 * | 3/2010 | Cheng | 99/323.1 |
| 2010/0132831 | A1 * | 6/2010 | Waroux et al. | 141/66 |
| 2011/0204093 | A1 * | 8/2011 | Lee | 222/152 |
| 2012/0272831 | A1 * | 11/2012 | Barberio et al. | 99/323.1 |

FOREIGN PATENT DOCUMENTS

| | | |
|---|---|---|
| CN | 1488310 A | 4/2004 |
| CN | 102014709 A | 4/2011 |

OTHER PUBLICATIONS

Feb. 7, 2013 Written Opinion for PCT/IB2012/055084.

* cited by examiner

DEVICE FOR PRESERVING AND DISPENSING WINE

CROSS-REFERENCE TO RELATED APPLICATIONS

This application is the National Stage of International Application No. PCT/IB2012/055084, filed Sep. 24, 2012, which claims priority of U.S. Application No. 61/538,808, filed Sep. 24, 2011. The entire disclosures of the preceding applications are hereby incorporated by reference into this application.

FIELD OF THE INVENTION

This invention is related to a machine for the preservation, dispensing and aeration of beverage.

BACKGROUND OF THE INVENTION

The conventional machines for preserving and dispensing wine only provide a convenience platform for the user to obtain a good quality glass of wine in a quick way. However, some wine needs to undergo wine oxidation for a while; in other words, in general a user cannot drink directly after dispensing.

In this invention, an aerator is connected to the dispensing head of a wine dispensing machine. As the wine is dispensed, it passes through the aerator and is aerated by mixing with air. The level of oxidation can be adjusted by controlling the air vent hole(s) in the aerator.

In one embodiment of this invention, a removable/detachable wine bottle securitization cartridge is connected to the wine preservation and dispensing machine. This detachable cartridge can lock and hold the wine bottle to the wine machine due to pressure difference between the atmosphere and the vacuum developed inside the bottle. Moreover, the air pump connected to the air path also helps in dispensing the wine.

SUMMARY OF THE INVENTION

The present invention provides a device for dispensing beverage with aeration. In one embodiment, the device is a wine preservation and dispensing machine having an aerating apparatus to provide a way to let the wine breathes while it is being dispensed. When wine is transferred into the machine, a mechanical pump removes all the air inside the bottle to prevent the wine from contacting ambient air. Additionally, said mechanical pump also can pump air inside the bottle for dispensing. The wine is kept in a storage chamber under vacuum and at a controlled temperature for preservation.

The taste of certain wines improves after the wine has been oxidized. The aerator has been developed to accelerate the oxidation process. A mechanical pump pumps air to increase the pressure inside the wine bottle and causes the wine to be pumped out and passed through the aerator, whereby ambient air sucked in from the vent hole(s) is mixed with the wine. A selector above the aerator can be adjusted to control the volume of air being mixed with the wine.

DETAILED DESCRIPTION OF THE FIGURES

FIGS. 1 (a) and (b) are perspective view of the exterior of the machine according to one embodiment of the invention. 10 is a rack, 11 is dispensing latch, 12 is a compartment of the machine, 26 is the tracks for installing the cartridge, 27 is dispensing head, 30 is a door, 31 is sealing gasket, 32 is dual color LED indicator, 36 is a cartridge, 37 is a button.

FIGS. 3 (a) and (b) are perspective views of the interior of the machine according to one embodiment of the invention, showing the main construction and components of the aeration system. 14 is selector, 15 is wine dispensing nozzle, 16 is latch, 17 is pump, 25 is "cartridge with wine bottle" assembly, 27 is bottle, 28 is air path and 29 is fluid path.

DETAILED DESCRIPTION OF THE INVENTION

The present invention is directed to a beverage system with aeration. In one embodiment, this invention provides a wine preservation and dispensing machine comprising a master housing unit, one or more dispensing heads and one or more cartridges.

Figure 1:
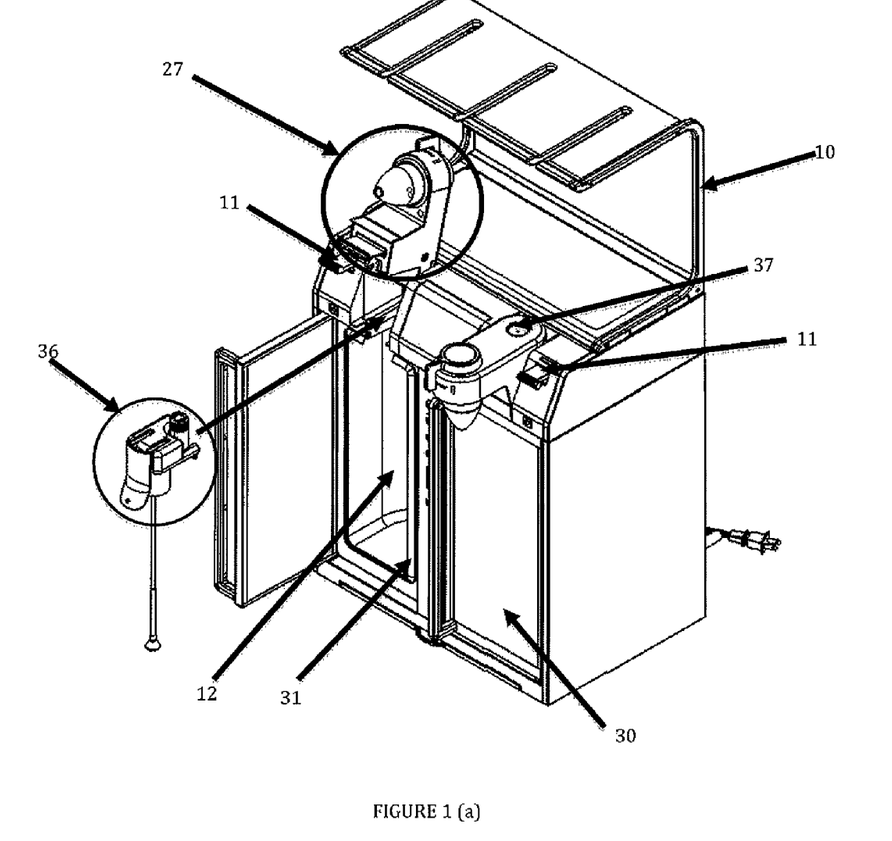

FIG. 1 shows an embodiment of the master unit. The master unit includes a removable rack (10) (e.g. a glass rack), two compartments (12) covered by the doors (30) (e.g. glass doors), and sealing gasket (31). The sealing gasket (31) mainly for prevent temperature lost inside the compartments during chilling. And there are also wine dispensing latches (11). Each compartment has interior lighting and it can fit one wine bottle for preservation. To install the cartridge and bottle assembly (25) into the master unit: first open the door, then presses the button (37) on top of the dispensing head to let it swing upward, and then slide the cartridge (36) and bottle assembly along the tracks (26) on the master body. After that, push the dispensing head back to the original position and close the door to start the preservation by pressing the On/Off switch (24). In this stage, the pump (17) will operate to pump out all the air inside the bottle (27). In one embodiment, the dual color LED indicator (32) shows blue color means that the bottle inside is negative pressure. For dispensing, presses the dispensing latches (11), the pump (17) starts again to pump ambient air inside the bottle, the dual color LED indicator (32) will turn green meaning that it is dispensing. After dispensing, the LED indicator keeps in green color to remind the user need to press preservation button on the touch panel (22) for pumping out the air inside the bottle again.

Figure 2:
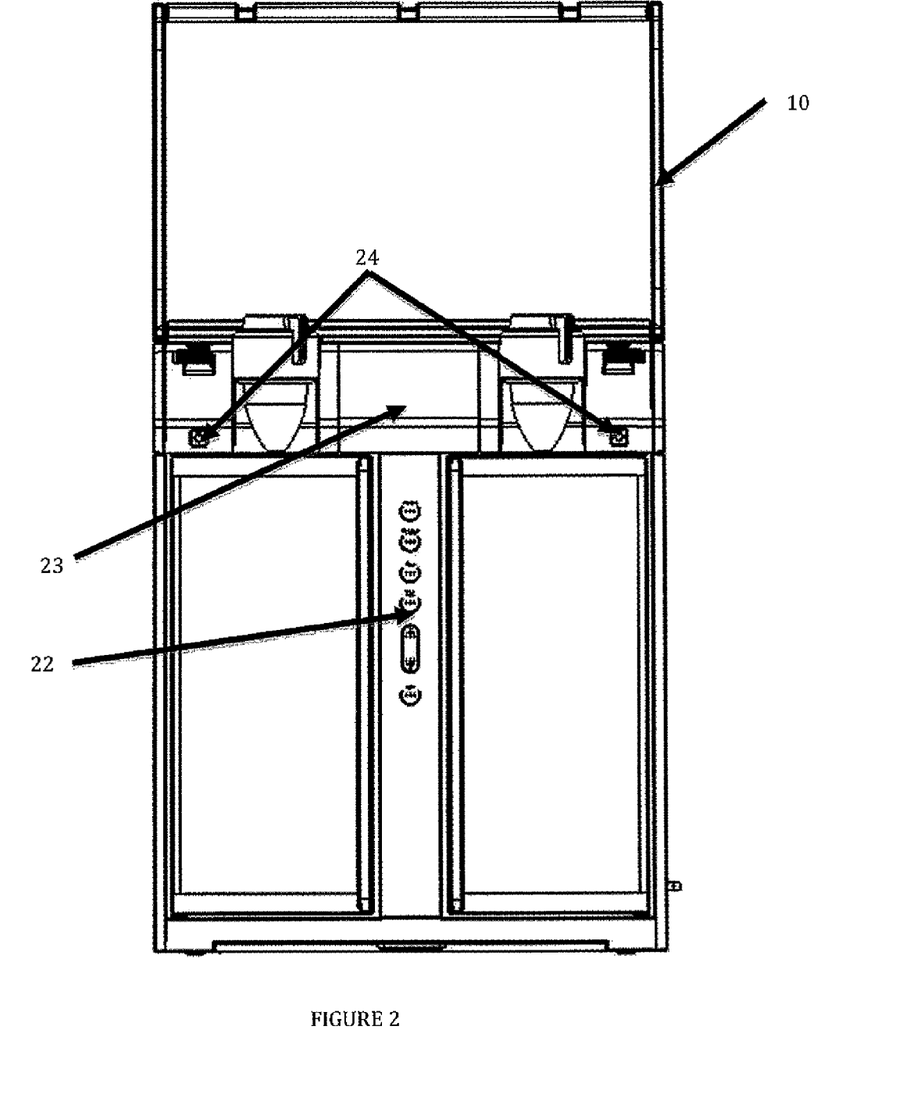
FIG. 2 is a frontal view of the exterior of the machine according to one embodiment of the invention. 22 is touch panel, 23 is display screen and 24 is On/OFF switch.
Figure 3:
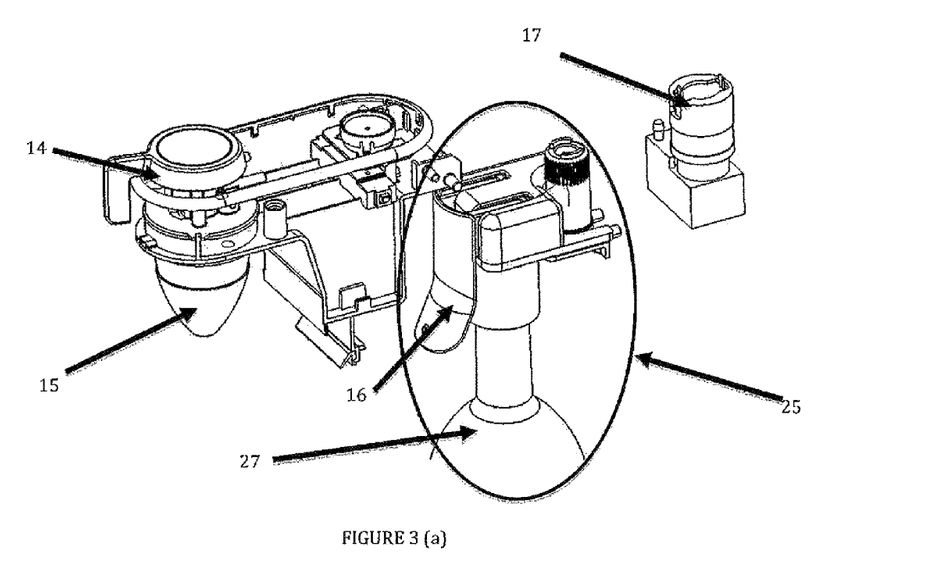

Cartridges (36). Above the compartments are removable/detachable cartridges as shown in FIG. 3. These cartridges (36) are used to hold the wine bottle and comprise a locking latch (16), a pair of air (28) and fluid flow (29) paths, and at least one track (26) for horizontal engagement. Further, these removable/detachable cartridges (36) can be cleaned in dishwasher machine. The master unit is controlled by a touch panel (22) with the settings and information shown on a display screen (23) and main ON/OFF switch (24) and dual color LED indicators (32) as illustrated in FIG. 2. The dual color LED indicator (32) will show the situation of the wine bottle (27) inside. For example, when the bottle is in negative pressure, i.e. in the preservation stage, the LED indicator (32) shows blue color; when the pump starts to operate, the bottle inside becomes normal pressure, it shows green color indicating that it is ready for dispensing. The information displayed includes, but not limited to, the set temperature, and the recommended storage temperature for each wine type.

Figure 6:
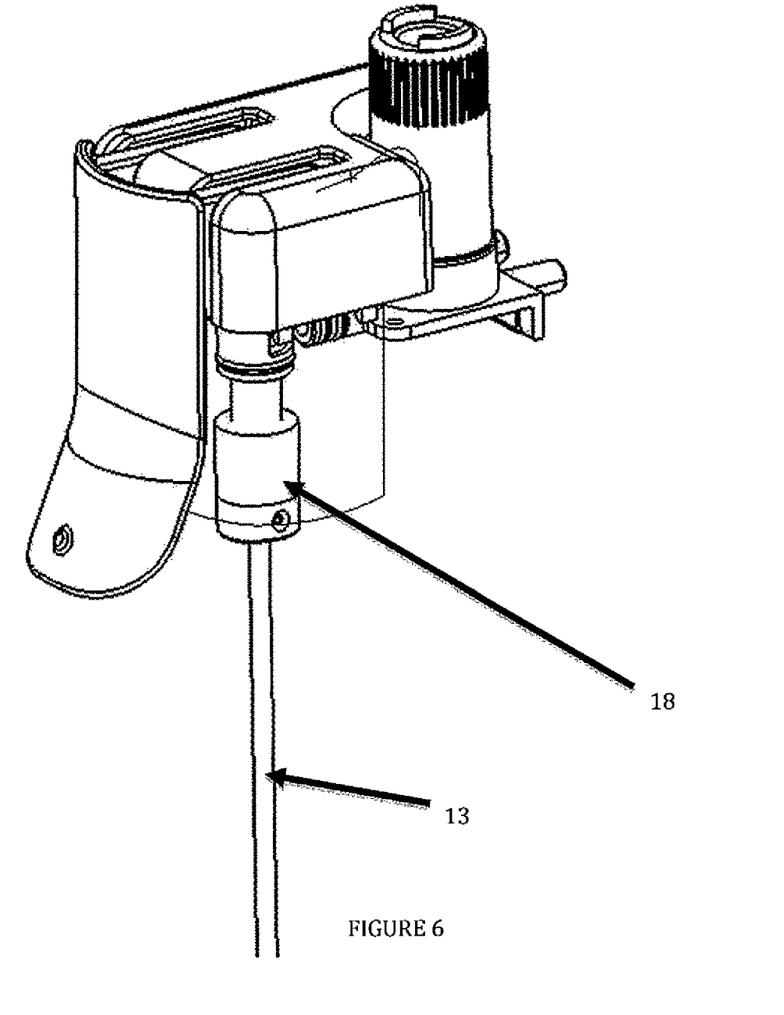
FIG. 6 is a perspective view of the cartridge according to one embodiment of the invention. 18 is silicon seal and 13 is pipe.

For the wine bottle installation, in one embodiment, the pipe (13) from the cartridge (36) (FIG. 6) is first inserted into the bottle (27) (FIG. 3), the latch (16), which acts as a lock for the bottle, then locks and causes the silicon seal (18) to deform, making a tight seal with the inner surface of the bottleneck. The whole "cartridge with wine bottle" assembly (25) is then installed into the master unit (FIG. 1). The master unit (FIGS. 1a & b) with a swing open dispensing head (27) is connected to a wine dispensing nozzle (15). One end of the air and fluid flow paths of the cartridge (36) is connected to the dispensing head with aerator and the other end is connected to the pump (17) which pumps out the air inside the bottle or pump out the wine inside the bottle for dispensing. After installation, the mechanical pump (17) is then connected to this assembly (25) and pumps out the air inside the bottle so as to prevent the wine from being oxidized. The bottle of wine is kept in the master unit compartment (12) for chilling and preservation. There are two functions of the dispensing latches (11): to open the valve to equalize the pressure inside the bottle to the atmosphere, and to pump air into the bottle for dispensing. These two actions would be operated in one single step during dispensing of wine. When air is pumped into the bottle, the wine is pumped out as the pressure inside of the bottle increases. In FIG. 3b, the "Air in" means the pump is started, ambient air is pumped in the cartridge and wine bottle assembly (25), the wine will be pumped out to the dispensing head with aerator through "wine out" path as the pressure inside of the bottle increased. This action is called dispensing.

The wine goes though the cartridge (36) and passes to the wine dispensing nozzle (15) which mixes the wine with air when the wine is dispensed through the wine dispensing nozzle (15).

Figure 5:
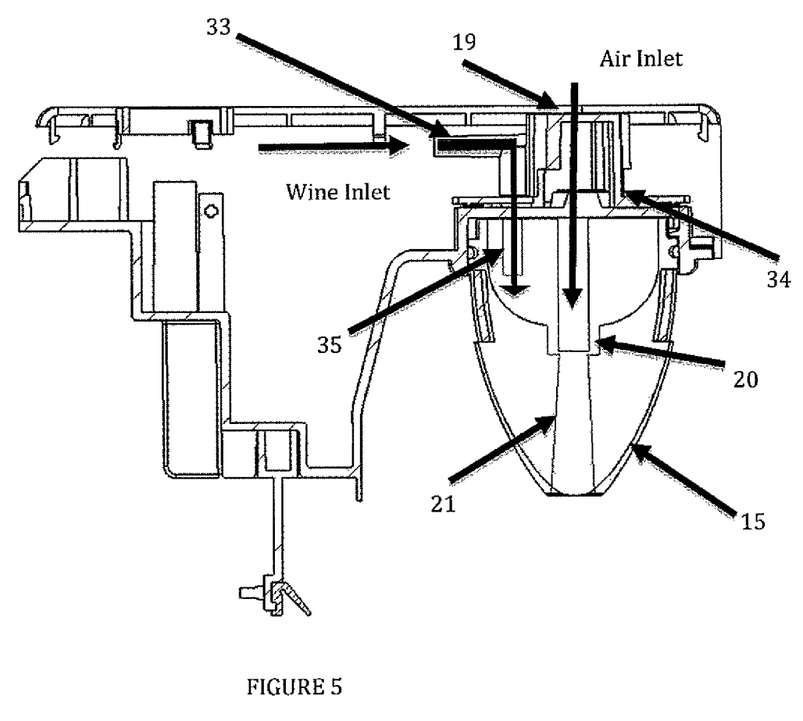
FIG. 5 is a cross-sectional view of the interior of one embodiment of the aerator. 19 is vent holes, 20 is buffer, 21 is channel, 33 is wine inlet tube, 34 is silicon ring and 35 is air tube.

Aeration System. FIG. 5 shows some details of this aeration system. There is at least one air hole (19) for air to get into the wine dispensing nozzle (15) through the air tube (35) for wine aeration. As wine passes through the buffer (20) area and then to the channel (21), the fluid flow causes the pressure inside the buffer (20) to decrease. As the wine dispensing nozzle (15) is sealed completely with the dispensing head (27) by a silicon ring (34), ambient air is limited and sucked into the buffer (20) through the air tube (35) when the wine is pumped into the wine dispensing nozzle (15) through the wine inlet tube (33). Wine and ambient air are therefore mixed together in this buffer (20) for the oxidation of wine. By controlling the air flow from the air hole(s) (19), the level of the wine aeration will be increased or decreased. If the air hole(s) (19) closed, then no aeration will be generated during dispensing. In one embodiment, the diameter of the buffer is 12 mm and the diameter of the channel is 6.5 mm. The ratio of these two diameter may vary. In another embodiment, the diameter of the buffer is 15 and the channel is 7 to 8 mm. In a separate embodiment, the buffer diameter is 10 and the channel is 4, 5 or 6 mm. In general the ratio of buffer to channel is 2 to 1.

Separate holes may be made for another source of aeration on the side to increase the amount of air if needed.

The wine dispensing nozzle (15) is detachable and cleanable, and can be made of or housed in transparent material, so that the whole aeration process is visible. In a further embodiment, the wine dispensing nozzle (15) can be cleaned separately in a dishwasher machine.

Figure 4:
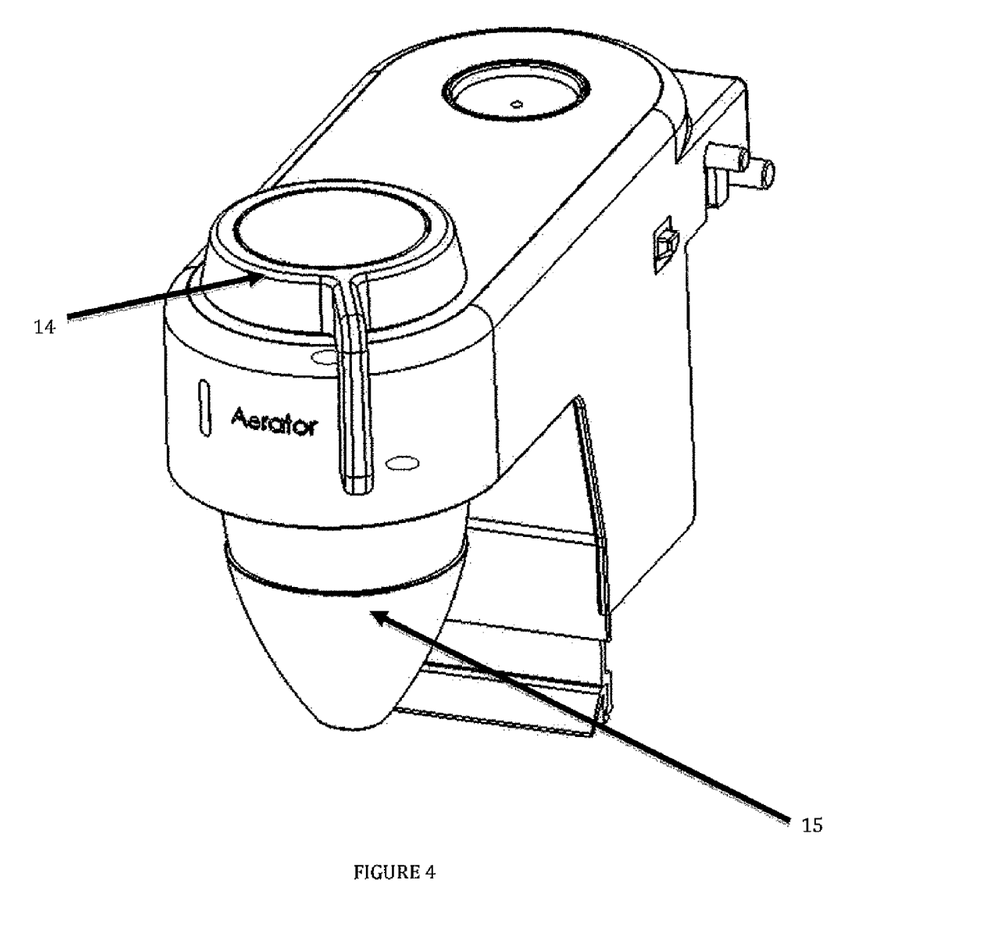
FIG. 4 is a perspective view of the exterior of one embodiment of the aerator. 14 is selector and 15 is wine dispensing nozzle.

The aeration process can be stopped by the user. A selector (14) is located on top of the wine dispensing nozzle (15) (FIG. 4). The main function of this selector (14) is to open or close at least one of the air vents (19).

The level of aeration can be controlled by adjustment of the air vent(s) hole size to limit the air flow into the wine dispensing nozzle (15). The air vent(s) size can be adjusted by mechanical or electronic means. For the mechanical method, in one embodiment can be a rotating knob to control the size of the vent hole(s). For the electronic method, the way can be a solenoid valve or solenoid piston to control the air flow into the wine or control the power of the pump to adjust the flow rate to increase or decrease the aeration process.

In another embodiment, the aeration process can be operated by an electronic device, such as an extra pump to pump ambient air into the wine during the dispensing process. An electronic device can be used for controlling the pump strength so as to adjust the level of aeration.

The aerator can be produced using any materials known in the art and in many different designs. For example, in one embodiment, a shower design of the dispensing head can increase the contact area of wine with ambient air.

For example, a shower head design connected to the wine outlet of the dispensing head may has many holes at the shower head. During the dispensing, wine goes through all the holes and then spill onto the wine dispensing nozzle (15) inside surface to increase the contact surface area of wine with ambient air. This also can help in wine oxidation. In another embodiment, extending the dispensing path also can help increase the contact area of wine with ambient air. For example, one of the options is a swivel type dispensing head. For example, the inside of the wine dispensing nozzle (15) will be design as a swivel channel. During dispensing, the wine will move along with this channel and create a swivel movement before dispensed into the glass.

In another embodiment, the cartridge and dispensing head exist as a single entity and the whole assembly can be separated from the master unit.

In one embodiment, the present invention provides a device for preserving and dispensing a beverage, the device comprises: (a) a housing comprising one or more compartments, each compartment for storing a beverage container; and (b) one or more dispensing head removably connected to a cartridge, wherein said dispensing head comprises an aerator for aerating said beverage, wherein said cartridge removably and securely holds a beverage container, wherein said beverage flows from said container to said dispensing head by the force of a pump connected to said cartridge.

In one embodiment, the aerator of the dispensing head comprises: at least one air vent hole leading into at least one air tube, the lower end of said air tube ending in a buffer area in a dispensing nozzle; a beverage inlet tube for beverage to flow from a beverage container to said buffer area; and a channel leading from said buffer area to an opening in said dispensing nozzle.

In one embodiment, the aerator further comprises a selector to control the size of said air vent hole.

In one embodiment, the above cartridge comprises: a locking latch; at least one air flow path and one fluid flow path; and at least one track for horizontally engaging said cartridge within said device. In one embodiment, one end of the air and fluid flow paths is connected to a pump and the other end of the air and fluid flow paths is connected to the dispensing head.

In one embodiment, the device of the present invention can be used to process wine.

In one embodiment, the device of the present invention further comprises a rack for placing one or more beverage containers. In another embodiment, the device further comprises a display screen. In yet another embodiment, the device further comprises a means of refrigeration to preserve said beverage at a specific temperature range in said compartments.

In another embodiment, the present invention also provides an aerator for aerating a beverage, comprising at least one air vent hole leading into at least one air tube, the lower end of said air tube ending in a buffer area in a dispensing nozzle; a beverage inlet tube for beverage to flow from a beverage container to said buffer area; and a channel leading from said buffer area to an opening in said dispensing nozzle. In one embodiment, the aerator further comprises a selector to control the size of said air vent hole.

In another embodiment, the present invention also provides a removable or detachable cartridge for securing a beverage container, comprising a locking latch for securing the beverage container; at least one air flow path and one fluid flow path; and at least one track for horizontally engaging said cartridge within a beverage dispensing device. In one embodiment, one end of the air and fluid flow paths is connected to a pump and the other end of the air and fluid flow paths is connected to a dispensing device.

In another embodiment, the present invention also provides a method of dispensing and aerating a beverage by passing said beverage through the device described herein. For example, such beverage can be wine.

Although a detailed description of one preferred embodiment of the present disclosure has been expressed using specific terms and devices, but those skilled in the art will readily appreciate that the specific examples are for illustrative purposes only and should not limit the scope of the invention which is defined by the claims which follow thereafter.

Throughout this application, various references or publications are cited. Disclosures of these references or publications in their entireties are hereby incorporated by reference into this application in order to more fully describe the state of the art to which this invention pertains. It is to be noted that the transitional term "comprising", which is synonymous with "including", "containing" or "characterized by", is inclusive or open-ended and does not exclude additional, un-recited elements or method steps.

What is claimed is:

1. A device for preserving and dispensing wine, comprising:
   a. a housing comprising one or more compartments, each compartment for storing a wine bottle; and
   b. one or more dispensing head removably connected to a cartridge, wherein said dispensing head comprises an aerator for oxidizing said wine, wherein said cartridge removably and securely holds a wine bottle, wherein said wine flows from said wine bottle to said dispensing head as a result of changes in pressure inside the wine bottle, due to a pump connected to said cartridge, wherein said aerator comprises:
      i. at least one air vent hole leading into at least one air tube, the lower end of said air tube ending in a buffer area in a dispensing nozzle;
      ii. a wine inlet tube for wine to flow from a wine bottle to said buffer area; and
      iii. a channel leading from said buffer area to an opening in said dispensing nozzle.

2. The device of claim 1, wherein said aerator further comprises a selector to control the size of said air vent hole.

3. The device of claim 1, wherein said cartridge comprises: a locking latch; at least one air flow path and one fluid flow path; and at least one track for horizontally engaging said cartridge within said device.

4. The device of claim 3, wherein one end of the air and fluid flow paths is connected to a pump and the other end of the air and fluid flow paths is connected to the dispensing head.

5. The device of claim 1, further comprising a rack for placing one or more wine bottles.

6. The device of claim 1, further comprising a display screen.

7. The device of claim 1, further comprising a means of refrigeration to preserve said wine at a specific temperature range in said compartments.

8. A method of dispensing and oxidizing wine by passing said wine through the device of claim 1.

\* \* \* \* \*